Dec. 26, 1967   R. X. MEYER   3,360,220
MAGNETOHYDRODYNAMIC METHOD AND APPARATUS
Filed Jan. 26, 1959   2 Sheets-Sheet 1
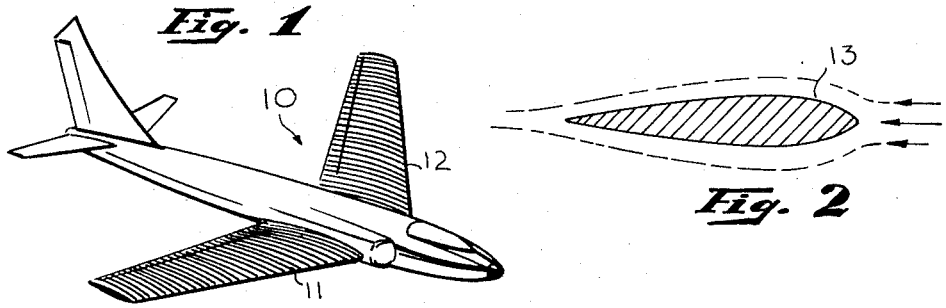
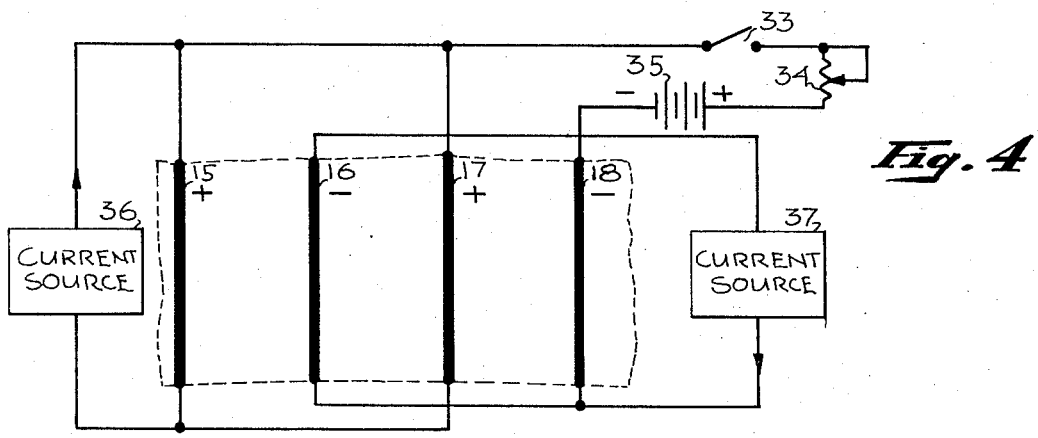
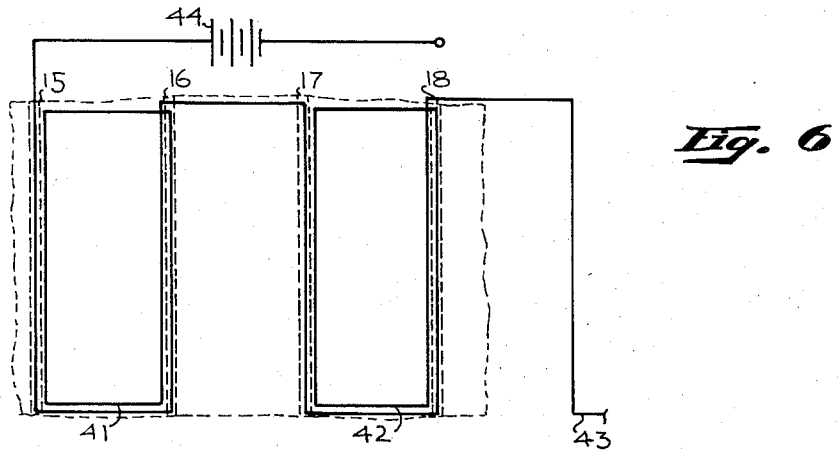
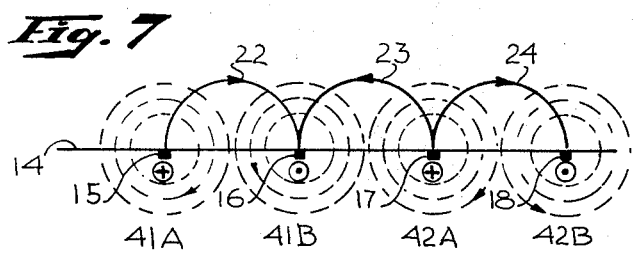
RUDOLF X. MEYER
INVENTOR.
BY
ATTORNEY

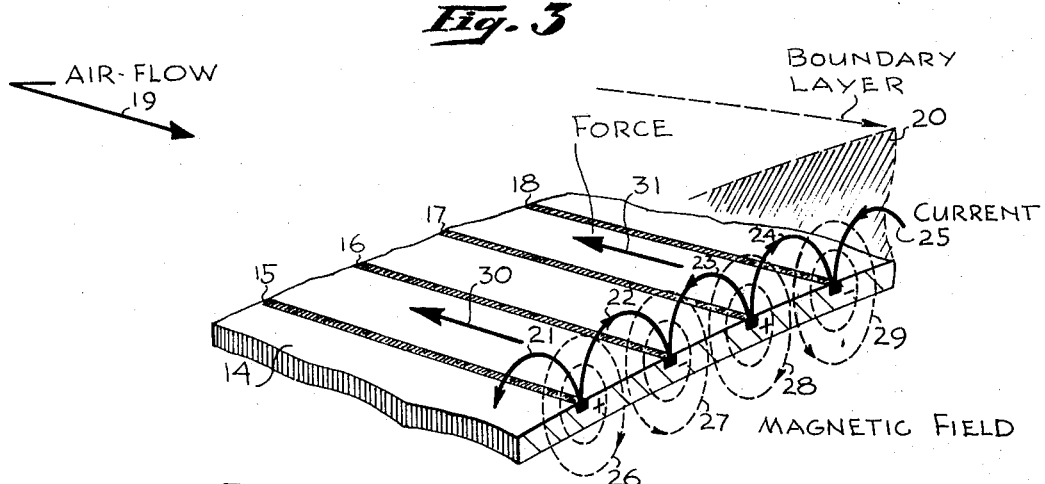
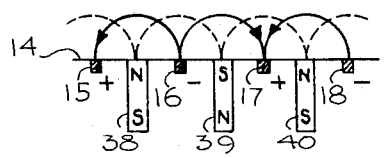
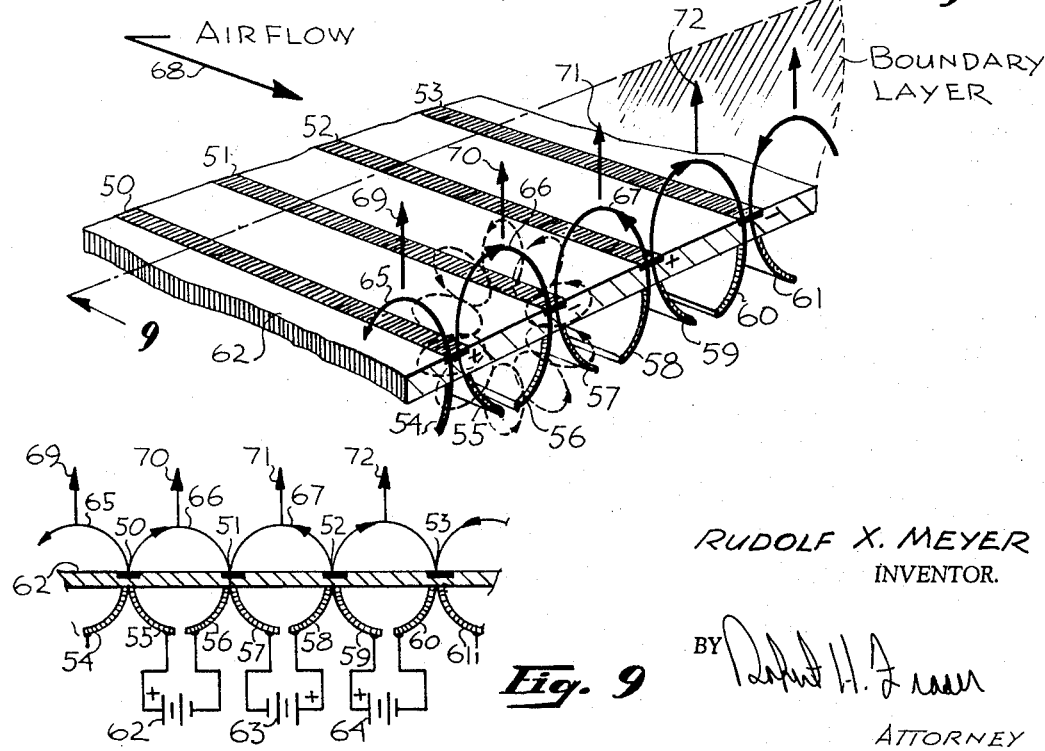
Rudolf X. Meyer
INVENTOR.

United States Patent Office
3,360,220
Patented Dec. 26, 1967

3,360,220
MAGNETOHYDRODYNAMIC METHOD
AND APPARATUS
Rudolf X. Meyer, Pacific Palisades, Calif., assignor, by mesne assignments, to Space-Technology Laboratories, Inc., El Segundo, Calif., a corporation of Delaware
Filed Jan. 26, 1959, Ser. No. 789,200
11 Claims. (Cl. 244—42)

This invention relates to a method and apparatus for magnetohydrodynamically controlling the forces associated with the flow of an electrically conductive medium and more particularly to a system in which a magnetic field is impressed upon an electrically conductive fluid medium to alter the flow pattern of the fluid or, in the alternative, to derive energy from a fluid flow.

Where an aerodynamic surface of a vehicle passes through an air mass, there is established a boundary layer in the region of the surface within which the air flow is retarded. One of the incidents of the retardation of the air flow is that an increased heat transfer may take place which elevates the temperature at the surface of the vehicle. At the relatively high speeds encountered in modern aircraft, the elevation of the temperature of an aerodynamic surface may produce a deterioration in the material of the surface with a consequent destruction of the vehicle. Accordingly, a critical problem arising in connection with high-speed aircraft has been the development of materials capable of withstanding high temperatures. While materials have been developed which are inherently capable of withstanding extremely high temperatures, a limitation upon the maximum speed of an aerodynamic surface through the atmosphere may be reached even though such temperature-resistant materials are employed.

Another problem frequently encountered at much lower velocities is that in which the lift coefficient of an aerodynamic surface is insufficient to maintain a vehicle in flight. Such a condition is normally encountered in conventional aircraft where the angle of attack and flight speed approach a stall condition. Although mechanical systems are frequently employed to alter the flow pattern within the boundary layer to increase the lift coefficient of an aerodynamic surface at low flight speeds, e.g. "trailing flaps," such mechanical systems require complex control mechanisms for their operation.

Again referring to the passage of an aerodynamic surface through an air mass at relatively high speeds, there has been no known simple mechanism for deriving electrical energy from the passage of air relative to the aerodynamic surface.

Accordingly, the present invention is primarily directed to a new method and apparatus operating in accordance with magnetohydrodynamic principles to transfer energy between an electrical conductor or other magnetic field source and a moving mass of air in a manner in which the flow pattern surrounding an aerodynamic surface may be altered to reduce the heat transfer of the aerodynamic surface, to increase the lift coefficient of an aerodynamic surface, or to derive electrical energy from the flow of air relative to an aerodynamic surface. Consequently, it is a principal object of the invention to provide a magnetohydrodynamic method and apparatus for controlling the flow pattern of an electrically conductive fluid surrounding an aerodynamic surface.

It is yet another object of the present invention to provide a magnetohydrodynamic method and apparatus for producing an interaction between a magnetic field and an electrically conductive fluid.

It is still another object of the present invention to provide a magnetohydrodynamic method and apparatus for reducing the heat transfer between an air mass and an areodynamic surface.

It is a further object of the present invention to provide a magnetohydrodynamic method and apparatus for altering the conditions of the flow of an air mass relative to an aerodynamic surface in a manner in which the areodynamic surface is capable of an increased lift coefficient.

It is a still further object of the present invention to provide a magnetohydrodynamic method and apparatus for deriving electrical energy from the relative movement of an electrically conductive fluid and an aerodynamic surface.

Briefly, is accordance with one aspect of the present invention, a magnetohydrodynamic method and apparatus are provided in which electrical energy may be transferred between a magnetic field source and an electrically conductive air mass in a manner in which the flow pattern of the air mass may be altered or electrical energy may be derived from an electrical conductor coupled to electrical current paths established within the moving air mass.

In accordance with one particular arrangement of the invention for reducing the heat transfer between an air mass moving relative to an aerodynamic surface, there is included means for establishing an electrical current flow through an air mass along with magnetic field sources which are adapted to establish magnetic fields which interact with the electrical current flow within the air mass to alter the flow pattern of the air mass with respect to an aerodynamic surface.

In accordance with another particular arrangement of the invention, the lift coefficient of an aerodynamic surface is altered by means of an interaction between electrical currents flowing within an air mass and a magnetic field generated in the region of the electrical currents which alters the flow pattern of the air mass in a boundary layer adjacent the aerodynamic surface. Still another particular arrangement of the present invention derives electrical energy from a moving air mass by means of a coupling between the air mass and at least one electrical conductor within which currents are induced as a function of the relative movement between the air mass and the electrical conductor.

The particular apparatus utilized in one embodiment of the invention for achieving a control of the flow pattern of air in a boundary layer surrounding an aerodynamic surface comprises a plurality of parallel electrodes spaced along the aerodynamic surface. Alternate ones of the electrodes are energized with respect to the others to produce a gaseous discharge between the electrodes through the air mass. A magnetic field may be generated either by current flow through the parallel electrodes or from a separate source which interacts with the electrical current flow within the air mass to impress forces upon the particles of the air mass which alter the flow pattern within the boundary layer.

Where the forces upon the particles of the air mass are in a direction opposing the flow, or away from the aerodynamic surface, a reduction in heat transfer may be achieved. Where the forces upon the particles of the air mass are in the direction of flow, or toward the aerodynamic surface, an increased lift coefficient may be achieved. In addition, electrical currents may be induced in the electrodes or an auxiliary coil by the moving air mass so that electrical energy is derived from the kinetic energy of the moving air mass.

A better understanding of the invention may be had from a reading of the following detailed description and an inspection of the drawings, in which:

FIG. 1 is a perspective view of an aircraft including an aerodynamic surface adapted to function in accordance with the method and apparatus of the invention;

FIG. 2 is a diagrammatic illustration of an aerodynamic surface of the aircraft of FIG. 1;

FIG. 3 is an enlarged perspective view of a portion of an aerodynamic surface including magnetohydrodynamic means in accordance with the invention;

FIG. 4 is a schematic circuit diagram illustrating the manner in which the arrangement of FIG. 3 may be connected to voltage and current sources;

FIG. 5 is a diagrammatic illustration of a magnetohydrodynamic arrangement similar to FIG. 3 in which a separate magnetic field source is provided by a plurality of permanent magnets;

FIG. 6 is an enlarged bottom view of a magnetohydrodynamic arrangement similar to FIG. 3 in which a separate magnetic field source is provided by coils;

FIG. 7 is a diagrammatic illustration of a magnetohydrodynamic arrangement utilizing coils as a magnetic field source in accordance with FIG. 6;

FIG. 8 is an enlarged perspective view of a portion of an aerodynamic surface including a plurality of parallel electrodes which function to establish currents through an electrically conductive fluid as well as to establish magnetic fields which interact with the electrical currents in accordance with the invention; and FIG. 9 is a sectional view taken along line 9—9 of FIG. 8.

In FIG. 1 there is illustrated an aircraft 10 having a number of aerodynamic surfaces including the wings 11 and 12. As is well known, in aircraft of the general type illustrated in FIG. 1, a flow of air surrounding the aerodynamic surfaces in flight is retarded in a boundary layer immediately adajcent each of the surfaces. At relatively high flight speeds, the kinetic energy of the flow of air within the boundary layer is dissipated in heat transferred to the aerodynamic surface which under extreme conditions may elevate the temperature at the aerodynamic surface to a level at which there is a deterioration of the material of which the surface is constructed. This effect is encountered not only in aircraft of the type illustrated in FIG. 1, but also in other types of high-speed vehicles such as missiles, rockets and satellites. The problem of excessive heat transfer to the surfaces of a flight vehicle is particularly acute upon the re-entry of a vehicle at high speed into the earth's atmosphere.

Another problem associated with the passage of an aerodynamic surface through an air mass occurs at relatively low speeds at which the aircraft approaches a condition known as a "stall," brought about by an insufficient lift being produced by the aerodynamic surfaces to maintain the aircraft in flight. It has been found that separation of the boundary layer from the aerodynamic surface at low flight speeds leads to a negative pressure gradient along the surface, which in turn triggers off a change in the flow pattern of the air around the aerodynamic surface in a manner which adversely affects the lift. In an effort to provide boundary layer control in the past for the purpose of increasing the lift coefficient of the wings of aircraft so as to reduce landing speeds, it is known to provide slots or porous walls in the aerodynamic surface, creating a suction, as well as to include flaps on the trailing edges of the wings.

FIG. 2 illustrates diagramatically the relationship between an aerodynamic surface 13 moving relative to an air mass which forms a boundary layer immediately adjacent the aerodynamic surface within which the flow of air is retarded by viscous dissipation of the kinetic energy. In accordance with the method and apparatus of the present invention, an aircraft of the general type illustrated in FIG. 1, as well as other types of vehicles, including for example, missiles, rockets and satellites, may be adapted to provide a control of the flow of a fluid medium such as air within the boundary layer. For this purpose, the wings 11 and 12 of the aircraft of FIG. 1 are equipped with a number of parallel electrodes arranged along the surfaces of the wings 12 in a direction generally parallel to the flow of air. For purposes of illustration, the spacing between the electrodes on the wings 11 and 12 has been exaggerated, it being understood that the actual spacing is determined in accordance with the considerations given below.

The construction and principles of operation of one arrangement in accordance with the invention may be best understood by reference to FIG. 3 in which there is illustrated in an enlarged view a portion of an aerodynamic surface 14 having a plurality of electrodes 15–18 embedded therein. The arrangement of FIG. 3 is adapted to control the flow of a fluid medium immediately adjacent the aerodynamic surface 14. For purposes of illustration, it will be assumed that the aerodynamic surface 14 is moving relative to an air mass with the direction of the flow of air relative to the aerodynamic surface 14 being indicated by the arrow 19. Furthermore, the shaded area 20 in the illustration of FIG. 3 represents the boundary layer within the flow of air is retarded adjacent the aerodynamic surface 14.

In operation, every other one of the electrodes 15–18 is energized from a suitable source of positive potential, while intermediate ones of the electrodes are energized from a source of negative potential. Thus, the odd numbered electrodes 15 and 17 may be positively energized, while the even numbered electrodes 16 and 18 may be negatively energized. Where the sources of potential applied to the electrodes 15–18 are suitably stabilized as described below, and where the spacing between the electrodes 15–18 is sufficiently small (typically 100 times the mean free path of the gas), a glow discharge can be obtained between adjacent pairs of electrodes. Thus, in FIG. 3 the arrows 21–25 represent glow discharge currents passing between adjacent ones of the electrodes 15–18 by means of electrically conductive paths established within the boundary layer 20. As is well known, a glow discharge may be established through a gas at a potential level less than that required for an arc discharge with relatively small amounts of current being pasesd by the glow discharge as compared to an arc. The glow discharge between the electrodes 15–18 functions to establish a condition of ionization which substantially increases the electrical conductivity of the gas. Hence, the currents flowing between the electrodes 15–18 of FIG. 3 establish discharge paths indicated by the arrows 21–25 which substantially increases the electrical conductivity of the air mass within the boundary layer 20.

A control of the flow pattern of the air within the boundary layer 20 is achieved in accordance with the invention by means of an interaction between a magnetic field and the charged particles of the air mass produced within the boundary layer 20 by the glow discharge currents 21–25. By passing a current through the odd numbered electrodes 15 and 17 in one direction, and by passing a current through the even numbered electrodes 16 and 18 in the opposite direction, magnetic fields may be generated surrounding each of the electrodes 15–18 as indicated by the dashed concentric circular representations 26–29. In accordance with the principles of magnetohydrodynamics, the magnetic fields represented at 26–29 interact with the charged particles of the air mass constituting the flow discharge currents in a manner in which a force is applied to the particles in the direction indicated by the arrows 30 and 31. Thus, since the arrows 30 and 31 oppose the direction of the flow of the air mass indicated by the arrow 19, the flow of the air mass within the boundary layer 20 may be retarded to reduce the contact between the moving air and the aerodynamic surface 14 which leads to a reduction in the heat transfer between the moving air mass and the surface. Accordingly, with the directions of current flow and magnetic field illustrated in FIG. 3, the method and apparatus of the invention may be employed to reduce the heating of an aerodynamic surface passing through an air mass at relatively high speeds. The result is that a flight vehicle may be readily adapted for high speed operation and for re-entry into the earth's atmosphere at high speeds without structural deterioration.

In order to reverse the direction of the forces indicated by the arrows 30 and 31, the direction of current flow through the electrodes 15–18 may be reversed so as to establish magnetic fields oriented in a manner opposite to that illustrated in FIG. 3, or in lieu of a reversal of the direction of current flow, the polarities of the electrodes 15–18 may be reversed. However, with reversed current or reversed polarity, essentially the same interaction between the magnetic fields and charged air mass particles occurs, except that the forces acting upon the particles are in a direction opposite to that indicated by the arrows 30 and 31. Accordingly, the established forces may be arranged to increase the velocity of the air within the boundary layer 20 so as to increase the lift coefficient of an aerodynamic surface with a consequent decrease in the speed at which a separation between the boundary layer and the aerodynamic surface 14 takes place. The result is that an aircraft may be adapted in accordance with the method and apparatus of the present invention for achieving a substantially lowered speed at which the stall effect occurs and lower landing speeds.

FIG. 4 illustrates the manner in which a plurality of electrodes in accordance with FIG. 3 may be connected to receive voltage and currents in an electrical circuit. In FIG. 4, the odd numbered electrodes 15 and 17 are connected by a switch 33 and a rheostat 34 to a source of positive potential 35. The negative terminal of the source of potential 35 may be connected to the even numbered electrodes 16 and 18 so that when the switch 33 is closed, alternate ones of the electrodes 15–18 are oppositely energized. In other words, by means of potential source 35 and the described connections of this source to electrodes 15–18, electrodes 15 and 17 are at a positive potential relative to electrodes 16 and 18 which, therefore, may be said to be at a negative potential. It is because of these differences of potential that the mentioned glow discharge currents are produced between the electrodes. The rheostat 34 connected serially with the source of potential 35 functions to stabilize the voltage appearing between adjacent ones of the electrodes 15–18 so as to establish and maintain a glow discharge between adjacent pairs of electrodes. With a spacing of one millimeter between the electrodes and an applied voltage of 400 volts, a glow discharge current of 10 milliampere/sq. millimeter may be established to produce a resultant ionization of up to 1% of the air passing adjacent the aerodynamic surface.

In the arrangement described above in connection with FIG. 3, the magnetic fields are established by current flow through the electrodes 15–18, the current flow being effected or supplied by means of current sources connected into the circuit of the electrodes. The schematic circuit diagram of FIG. 4 illustrates one way in which such a current flow may be achieved in which a first current source 36 is connected across the positively energized electrodes 15 and 17 and a second current source 37 is connected across the negatively energized electrodes 16 and 18. As noted previously, the direction of the forces produced by the interaction between the ionized air mass and the magnetic fields generated by current flow through the electrodes 15–18 may be reversed by either reversing the direction of magnetic field establishing current flow through the electrodes, or by reversing the polarity of the electrodes. Accordingly, in the arrangement of FIG. 4, the forces acting upon the air mass may be reversed merely by reversing the directions of current flow from the current sources 36 and 37, or by reversing the connections to the potential source 35.

One alternative arrangement for generating magnetic fields for interaction with the ionized air particles within a boundary layer is illustrated in FIG. 5 in which a plurality of strip electrodes 15–18 are arranged and energized in a manner substantially identical to that described above in connection with FIGS. 3 and 4. However, in FIG. 5, magnetic field sources are provided by means of permanent magnets 38, 39 and 40 positioned between the electrodes 15–18. With the orientation of the magnetic fields from the permanent magnets 38–40 and the glow discharge currents between the electrodes 15–18 illustrated in FIG. 5, a force is created upon a moving air mass in a direction into the drawing sheet. However, by reversing the magnets 38–40 or reversing the polarities of the voltages on the electrodes 15–18, a force may be generated in a direction out of the drawing sheet. Hence, the permanent magnetic field sources 38–40 function to generate magnetic fields which interact with the ionized air particles produced by the glow discharge between the electrodes in a manner analagous to that described above in connection with FIG. 3.

The arrangement of FIG. 5 has been constructed and tested, the only deviation from FIG. 5 in the constructed arrangement being that electrical insulation was inserted for practical reasons between the magnets and the electrodes. Specifically, a NASA airfoil number 643618 was used, the airfoil having span and chord lengths of 5 inches. With this type of airfoil, 60 electrodes made of copper were utilized, 30 of the electrodes maintained at a positive potential and the remaining 30 being maintained at a negative potential as was mentioned heretofore. As constructed, the electrodes were 4 inches long, ¾ of an inch high and $20/1000$ of an inch wide or thick. A voltage supply of 500 volts was used to energize the electrodes in order to provide the glow discharge currents so that the potential difference between adjacent electrodes was 500 volts.

Furthermore, 60 Alnico permanent magnets were employed, 30 magnets having their North Pole up and 30 having their South Pole up in the manner illustrated in FIG. 5, the peak horizontal component of flux density being 500 gauss and the peak vertical component of flux density being 700 gauss. Since the magnets extended along the full length of the electrodes, the length of the magnets are, therefore, also 4 inches. As used, the width of the referred-to magnet are $20/1000$ of an inch.

Positioned between the electrodes and the magnets are strips of mica insulation, the strips also being 4 inches long and $20/1000$ of an inch wide.

With this type of a construction and with the angle of attack of the airfoil adjusted between zero to 20° and the air pressure from 2 to 20 mm. of mercury, the glow discharge current per pair of adjacent electrodes is 10 ma. or, stated differently, the total glow discharge current was found to be 0.3 amps.

An alternative arrangement for generating a magnetic field from a separate source in accordance with the invention is illustrated in FIG. 6 which comprises a bottom view of an aerodynamic surface with four parallel strip electrodes on the top side of the surface being illustrated in phantom. In FIG. 6 three windings or coils 41, 42 and 43 are connected serially and receive current from a suitable power supply source 44. The magnetic fields established by the coils 41, 42 and 43 may be best understood by reference to the simplified illustration of FIG. 7 in which the single conductors 41A, 41B correspond to the several conductors of the coil 41 and the single conductors 42A and 42B correspond to the several conductors of the coil 42. As may be seen in FIG. 7, the conductors of the coils are mounted beneath and immediately adjacent each of the electrodes 15–18 so that when a current is passed through the conductors in the directions indicated by the conventional · and + symbols, magnetic fields are established as illustrated by the dashed concentric circles which meet the glow discharge current paths 22, 23 and 24 at right angles so as to produce a force upon the ionized gas particles within a boundary layer adjacent the aerodynamic surface 14 in a direction into the drawing sheet. As before, by reversing either the direction of current flow through the coil windings or the polarities of the electrodes 15–18, the direction of the force on the air mass particles may be reversed.

Another application of the principles of the present invention is in the generation of electrical power from the kinetic energy contained in an air mass moving relative to an aerodynamic surface. Where the directions of the magnetic fields and glow discharge currents are such as to oppose the flow of the air mass as illustrated in FIG. 3, the passage of the ionized air particles adjacent the electrodes 15, 16, 17 and 18 functions in a manner of a generator to induce currents therein. Accordingly, at extremely high speeds with high relative velocity between the moving air mass and the aerodynamic surface 14, electrical power may be derived from the electrodes 15–18 by connecting the electrodes in a suitable electrical utilization circuit. In addition, where the arrangement is to be utilized primarily for boundary layer control at relatively high speeds, the voltages attendant the induction of currents in the electrodes 15–18 may be sufficiently large to create a glow discharge so that the apparatus may be operated without an external source of supply voltage. As before, the alternative arrangements for the generation of magnetic fields illustrated in FIGS. 5, 6 and 7 may be readily employed for either the generation of electrical power or the control of a boundary layer of moving air wherein useful advantage is taken of the induced currents and voltages.

While the direction of the force applied to a moving air mass may be reversed or oriented as desired by a suitable positioning of the strip electrodes in the arrangements described in FIGS. 3–7, in each instance the forces act in a direction parallel to the plane of the aerodynamic surface. An alternative arrangement in which forces may be generated upon the particles of a moving air mass in a direction normal to an aerodynamic surface is illustrated in FIGS. 8 and 9. In the arrangement of FIGS. 8 and 9, a plurality of strip electrodes 50, 51, 52 and 53 receive energizing potentials from segmented semi-cylindrical connectors 54–61 mounted beneath an aerodynamic surface 62. Between the segments associated with each adjacent pair of the strip electrodes 50–53 there may be connected suitable potential sources as for example, the sources 62, 63 and 64 which are oppositely poled to energize adjacent ones of the electrodes 50–53 with opposite polarity. Accordingly, glow discharge currents as indicated by the paths 65, 66 and 67 may be established between the electrodes in a manner somewhat similar to that described previously. However, current flow within the glow discharge paths 65–67 travels from the potential sources 62–64 via the segmented semi-cylindrical electrodes so that the current path as a whole is substantially circular when viewed in FIG. 9 and substantially cylindrical when considered along the length of the electrodes 50–53.

As is well known, where a current is passed through a conductive circular ring, magnetic fields are established which tend to enlarge the ring due to the forces applied to the current carrying conductor by the interaction between the associated magnetic fields and the current. The magnetic fields generated by the current flow are illustrated diagrammatically in FIG. 8 by means of the dashed circles surrounding the current paths. Since the current paths 65–67 comprise charged particles of air in a boundary layer immediately adjacent the aerodynamic surface 62, a force is established acting upon the air mass in a direction normal to the aerodynamic surface 62 which tends to push the air mass away from the surface. Accordingly, a moving air mass arriving at the aerodynamic surface 62 in a direction indicated by the arrow 68 (FIG. 8) is deflected upwardly by virtue of the forces established by the interaction between the glow discharge currents and the associated magnetic fields. The direction of the resultant forces on the air mass is indicated in FIGS. 8 and 9 by the direction of the arrows 69–72. Thus, the arrangement of FIG. 8 may be employed to reduce the heat transfer between a moving air mass and an aerodynamic surface by deflecting the moving particles of air away from the aerodynamic surface 62. A further advantage of the arrangement of FIG. 8 is that the same power supply source may be employed both to establish the potentials on the electrodes 50–53 which produce the glow discharge, as well as to generate the magnetic fields which interact with the charged air particles.

Although a number of particular arrangements have been described above, the invention is not limited thereto since each of the examples is given for the illustrative purpose of enabling one skilled in the art to adapt the invention for practical use wherever an interaction between an electrically conductive fluid medium and a magnetic field is required. Accordingly, the invention should be considered to include any and all arrangements falling within the scope of the annexed claims.

What is claimed is:

1. In a boundary layer control system, an aerodynamic surface arranged for relative movement with respect to an air mass which flows in a boundary layer adjacent said surface, means for rendering the air within said layer electrically conductive, and means for generating a magnetic field within and for interaction with the electrically conductive air to alter the boundary layer air flow pattern.

2. A system for controlling the flow of an electrically conductive medium including the combination of an aerodynamic surface arranged for relative movement with respect to the electrically conductive medium, means initiating a glow discharge through the electrically conductive medium in a region of the aerodynamic surface, and a magnetic field source associated with the aerodynamic surface for generating a magnetic field in the region of the glow discharge which interacts with current carrying particles within the electrically conductive medium to impress forces upon the particles of the electrically conductive medium to alter the flow pattern adjacent the aerodynamic surface.

3. In a vehicle having surface portions exposed to the flow of air during flight under velocity conditions which produce heating of the surface portions, the combination of a plurality of longitudinally-extending laterally-spaced electrodes supported by the surface portions of the vehicle, means for energizing adjacent pairs of the electrodes to produce a gaseous discharge between the electrodes, and means for generating a magnetic field in the region of the gaseous discharge which interacts with the gaseous discharge to reduce the transfer of heat to the surface portions of the vehicle.

4. A boundary layer control system including the combination of an aerodynamic surface arranged to pass through an air mass, a plurality of electrodes mounted along the aerodynamic surface, means for energizing the electrodes to produce a current flow through the air within a boundary layer adjacent the aerodynamic surface, and a magnetic field generating means associated with the aerodynamic surface for producing a magnetic field within the boundary layer which interacts with the current flow through the air to create forces which alter the flow of air within the bundary layer.

5. Apparatus in accordance with claim 4 in which said magnetic field source comprises at least one current-carrying conductor oriented to produce a magnetic field in response to current passed therethrough in the region of the boundary layer.

6. Apparatus in accordance with claim 4 in which the magnetic field source comprises at least one permanent magnet oriented to produce a magnetic field in the region of the boundary layer.

7. A magnetohydrodynamic system for increasing the lift coefficient of a selected surface of an aircraft including the combination of an aerodynamic surface associated with the aircraft for movement through an air mass in which a boundary layer is formed surrounding the aerodynamic surface, means associated with the aerodynamic surface for rendering the air within the boundary layer electrically conductive, and a magnetic field source arranged to generate a magnetic field within the boundary layer which functions to alter the flow of air along the aerodynamic surface in a manner in which forces are generated which increase the lift coefficient of the aerodynamic surface.

8. A boundary layer control system for use in altering the flow pattern surrounding an aerodynamic surface, including the combination of a plurality of electrically conductive strips supported in closely spaced parallel relationship along the aerodynamic surface, means applying potentials of opposite polarity to adjacent ones of the plurality of strips having a magnitude sufficiently large to produce a glow discharge within the air flowing along the aerodynamic surface, and means passing currents through the plurality of strips to generate magnetic fields which interact with the gaseous discharge currents between the strips in a manner in which the flow pattern of the air adjacent the aerodynamic surface is altered.

9. A boundary layer control system for use in altering the flow pattern surrounding an aerodynamic surface including the combination of a plurality of electrically conductive strips supported in closely spaced parallel relationship along the aerodynamic surface, means applying potentials of opposite polarity to adjacent ones of the plurality of strips having a magnitude sufficiently large to produce a glow discharge within the air flowing along the aerodynamic surface, and a magnetic field source positioned adjacent the plurality of strips for producing a magnetic field which interacts with the gaseous discharge currents between the strips in a manner in which the flow of air adjacent the aerodynamic surface is altered.

10. Apparatus in accordance with claim 9 in which the magnetic field source comprises at least one current-carrying conductor which produces a magnetic field in the region of the gaseous discharge currents between the strips.

11. Apparatus in accordance with claim 9 in which the magnetic field source comprises at least one permanent magnet arranged to produce a magnetic field within the region of the gaseous region discharge currents between the strips.

References Cited

FOREIGN PATENTS 635,784   4/1950   Great Britain.

OTHER REFERENCES

Kantrowitz: "Introducing Magnetohydrodynamics," Astronautics, vol. 3, No. 10, October 1958, pp. 18–20 and 74–7.

Sears: "Magnetohydrodynamic Effects in Aerodynamic Flows," ARS Journal, vol. 29, No. 6, June 1959, pp. 397–406.

N.A.C.A. Technical Note 3971, May 1957.

MILTON BUCHLER, *Primary Examiner.*

NORMAN H. EVANS, CHESTER L. JUSTUS, EMILE PAUL, ARTHUR HORTON, *Examiners.*

D. G. REDINBAUGH, A. E. HALL, R. F. STAHL, B. BELKIN, *Assistant Examiners.*